United States Patent
Yoo et al.

(10) Patent No.: US 10,336,155 B2
(45) Date of Patent: Jul. 2, 2019

(54) AIR CONDITIONING SYSTEM FOR HYBRID VEHICLES

(71) Applicant: HANON SYSTEMS, Daejeon (KR)

(72) Inventors: Sang Jun Yoo, Daejeon (KR); Young Min Kim, Daejeon (KR); Tae Eun Kim, Daejeon (KR); Se Won Min, Daejeon (KR); Chang Hyun Baek, Daejeon (KR); Hong Rae Jung, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 193 days.

(21) Appl. No.: 15/320,173

(22) PCT Filed: Sep. 23, 2015

(86) PCT No.: PCT/KR2015/010015
§ 371 (c)(1),
(2) Date: Dec. 19, 2016

(87) PCT Pub. No.: WO2016/048032
PCT Pub. Date: Mar. 31, 2016

(65) Prior Publication Data
US 2017/0190232 A1    Jul. 6, 2017

(30) Foreign Application Priority Data

Sep. 24, 2014  (KR) .......................... 10-2014-0127471
Sep. 23, 2015  (KR) .......................... 10-2015-0134431

(51) Int. Cl.
*B60H 1/00* (2006.01)
*B60H 1/04* (2006.01)
*B60H 1/32* (2006.01)

(52) U.S. Cl.
CPC ......... *B60H 1/004* (2013.01); *B60H 1/00071* (2013.01); *B60H 1/00735* (2013.01);
(Continued)

(58) Field of Classification Search
CPC ................ B60H 1/004; B60H 1/00071; B60H 1/00735; B60H 1/00764; B60H 1/00885;
(Continued)

(56) References Cited

U.S. PATENT DOCUMENTS

2011/0005255 A1* 1/2011 Tanihata ............ B60H 1/00785
62/238.7
2014/0223943 A1* 8/2014 Ichishi ................. B60H 1/3205
62/215

FOREIGN PATENT DOCUMENTS

JP      2012166667 A    9/2012
KR   1020070110603 A   11/2007
(Continued)

*Primary Examiner* — Marthe Y Marc-Coleman
(74) *Attorney, Agent, or Firm* — Shumaker, Loop & Kendrick, LLP; James D. Miller

(57) ABSTRACT

An air conditioning system for hybrid vehicles includes: a heater core receiving engine cooling water from an engine and heat an air blown into a vehicle room; an electric water pump pumping the engine cooling water through the heater core when a motor vehicle is switched from an engine drive mode to a motor drive mode; a discharged air temperature sensing unit sensing a discharged air temperature as a temperature of an air discharged into the vehicle room; and a control unit when the motor vehicle is switched from the engine drive mode to the motor drive mode differentially controls a rotational speed of the electric water pump depending on a temperature difference between the discharged air temperature inputted from the discharged air temperature sensing unit and a target discharge temperature calculated in advance based on internal/external temperature conditions and a user set temperature.

12 Claims, 2 Drawing Sheets

(52) U.S. Cl.
CPC ..... *B60H 1/00764* (2013.01); *B60H 1/00885* (2013.01); *B60H 1/04* (2013.01); *B60H 2001/3255* (2013.01)

(58) Field of Classification Search
CPC .............. B60H 1/04; B60H 2001/3255; B60L 11/1874; B60L 2240/662; B60L 2240/545
USPC ...... 701/36; 165/287, 292, 299; 237/12.3 A, 237/2 A
See application file for complete search history.

(56) References Cited

FOREIGN PATENT DOCUMENTS

| | | | | |
|---|---|---|---|---|
| KR | 20080035263 | A | * | 4/2008 |
| KR | 1020080035263 | A | | 4/2008 |
| KR | 1020110109023 | A | | 10/2011 |
| KR | 20120131929 | A | * | 12/2012 |
| KR | 1020120131929 | A | | 12/2012 |

* cited by examiner

AIR CONDITIONING SYSTEM FOR HYBRID VEHICLES

CROSS-REFERENCE TO RELATED PATENT APPLICATIONS

This patent application is a United States national phase patent application based on PCT/KR2015/010015 filed Sep. 23, 2015, which claims the benefit of Korean Patent Application No. 10-2014-0127471 filed Sep. 24, 2014 and Korean Patent Application No. 10-2015-0134431 dated Sep. 23, 2015, the disclosures of which are hereby incorporated herein by reference in their entirety.

FIELD

The present invention relates to an air conditioning system for hybrid vehicles. More particularly, the present invention pertains to an air conditioning system for hybrid vehicles which is configured to accurately control the rotational speed of an electric water pump depending on the thermal load of a heater core during a motor drive mode and which is capable of optimally controlling the amount of engine cooling water circulated through the heater core in conformity with the thermal load of the heater core and capable of optimally controlling the heat generation amount of the heater core.

BACKGROUND

A hybrid vehicle refers to a motor vehicle that uses an electric motor and an internal combustion engine in combination. In the case where the drive load of the hybrid vehicle is large, for example, when the hybrid vehicle is driven at a high speed or when the hybrid vehicle is driven on an uphill road, the hybrid vehicle is operated in an engine drive mode in which the internal combustion engine is used.

Conversely, in the case where the drive load of the hybrid vehicle is small, for example, when the hybrid vehicle is driven at a low speed or when the hybrid vehicle is stopped, the hybrid vehicle is operated in a motor drive mode in which the electric motor is used.

Such a hybrid vehicle is provided with an air conditioning system for cooling or heating a vehicle room. As illustrated in FIG. 1, the air conditioning system includes an air conditioner case 1 in which a blower 3, an evaporator 5, a heater core 7 and a temperature door 8 are installed.

The blower 3 is configured to draw an internal air or an external air and to blow the same toward an internal passage 1a of the air conditioner case 1. The evaporator 5 is configured to cool the air blown toward the internal passage 1a. The heater core 7 is configured to heat the air blown toward the internal passage 1a. The temperature door 8 is rotated between a cold air passage 1b and a hot air passage 1c to adjust the opening degree of the cold air passage 1b or the hot air passage 1c.

In particular, the heater core 7 is configured to receive hot cooling water from an engine 9, thereby allowing the hot cooling water to exchange heat with the ambient air. Thus, the heater core 7 heats the air blown into the vehicle room, consequently heating the vehicle room.

In this regard, an electric water pump 9a is installed between the heater core 7 and the engine 9. If the motor vehicle is switched from an engine drive mode to a motor drive mode, the electric water pump 9a forcibly pumps the cooling water of the engine 9 and forcibly circulates the cooling water through the heater core 7.

Thus, when the engine 9 is stopped as the motor vehicle is switched from the engine drive mode to the motor drive mode, the electric water pump 9a prevents the circulation of the engine cooling water through the heater core 7 from being stopped due to the stoppage of the engine 9, consequently preventing reduction of heat generation in the heater core 7.

Accordingly, during the motor drive mode, the engine cooling water is continuously circulated through the heater core 7 even if the engine 9 is stopped. As a result, even when the engine 9 is stopped, the heater core 7 continues to generate heat, thereby continuously heating the vehicle room.

In general, the electric water pump 9a is configured so that the rotational speed thereof is automatically controlled depending on the rotation speed level of the blower 3.

The reason for employing this configuration is to control the rotational speed of the electric water pump 9a depending on the thermal load of the heater core 7 which corresponds to the rotation speed level of the blower 3.

In this way, the heat generation amount of the heater core 7 is controlled depending on the thermal load of the heater core 7, whereby the temperature of the air discharged into the vehicle room is automatically controlled depending on the thermal load of the heater core 7.

However, the air conditioning system of the prior art has a structure in which the rotation speed level of the blower 3 is not accurately controlled depending on the thermal load of the heater core 7. Thus, the electric water pump 9a controlled based on the rotation speed level of the blower 3 is not accurately controlled depending on the thermal load of the heater core 7. This poses a problem in that the rotational speed of the electric water pump 9a may be set too high or too low as compared with the thermal load of the heater core 7.

Specifically, the rotation speed level of the blower 3 is controlled at about eight levels depending on the thermal load of the heater core 7. This makes it impossible to accurately control the rotation speed level of the blower 3 depending on the thermal load of the heater core 7. Thus, the electric water pump 9a controlled based on the rotation speed level of the blower 3 is not accurately controlled depending on the thermal load of the heater core 7.

For that reason, there may be a case where the rotational speed of the electric water pump 9a is too high or too low as compared with the actual thermal load of the heater core 7. This may pose a problem in that the amount of the engine cooling water circulated through the heater core 7 is excessively increased or decreased.

Particularly, if the rotational speed of the electric water pump 9a is too high as compared with the thermal load and if the amount of the engine cooling water circulated through the heater core 7 is excessively increased, the heat generation amount of the heater core 7 grows higher as compared with the thermal load. Thus, the temperature of the air discharged into the vehicle room is increased, thereby making the vehicle room unpleasant.

In addition, if the amount of the engine cooling water circulated through the heater core 7 is excessively increased, the temperature of the engine 9 is prematurely decreased. For that reason, when restarting the engine 9, the operation efficiency of the engine 9 may be decreased. As a result, the fuel efficiency of the motor vehicle may be reduced.

On the other hand, if the rotational speed of the electric water pump 9a is too low as compared with the thermal load and if the amount of the engine cooling water circulated through the heater core 7 is excessively decreased, the heat generation amount of the heater core 7 grows lower as compared with the thermal load. Thus, the temperature of the air discharged into the vehicle room is decreased, thereby deteriorating the pleasantness of the vehicle room.

SUMMARY

In view of the aforementioned problems, it is an object of the present invention to provide an air conditioning system for hybrid vehicles which is capable of accurately controlling the rotational speed of an electric water pump depending on the thermal load of a heater core in a motor drive mode.

Another object of the present invention is to provide an air conditioning system for hybrid vehicles which is configured to accurately control the rotational speed of an electric water pump depending on the thermal load of a heater core in a motor drive mode and which is capable of optimally controlling the amount of engine cooling water circulated through the heater core in conformity with the thermal load of the heater core.

A further object of the present invention is to provide an air conditioning system for hybrid vehicles which is configured to optimally control the amount of engine cooling water circulated through the heater core in conformity with the thermal load of the heater core and which is capable of optimally controlling the heat generation amount of the heater core in conformity with the thermal load thereof and capable of optimally controlling the temperature of the air discharged into a vehicle room.

A still further object of the present invention is to provide an air conditioning system for hybrid vehicles which is configured to optimally control the amount of engine cooling water circulated through the heater core in conformity with the thermal load of the heater core and which is capable of preventing the excessive circulation of engine cooling water and the resultant excessive reduction of an engine temperature and preventing the reduction of engine operation efficiency when restarting an engine.

In order to achieve the above objects, there is provided an air conditioning system for hybrid vehicles, including: a heater core configured to receive engine cooling water from an engine and heat an air blown into a vehicle room; an electric water pump configured to pump the engine cooling water and to forcibly circulate the engine cooling water through the heater core when a motor vehicle is switched from an engine drive mode to a motor drive mode; a discharged air temperature sensing unit configured to sense a discharged air temperature as a temperature of an air discharged into the vehicle room; and a control unit configured to, when the motor vehicle is switched from the engine drive mode to the motor drive mode, differentially control a rotational speed of the electric water pump depending on a temperature difference between the discharged air temperature inputted from the discharged air temperature sensing unit and a target discharge temperature calculated in advance based on internal/external temperature conditions and a user set temperature, so that an amount of the engine cooling water supplied to the heater core is differentially controlled depending on the temperature difference.

In air conditioning system, the control unit may include an operation unit configured to, in the motor drive mode, calculate the temperature difference between the discharged air temperature and the target discharge temperature by processing the discharged air temperature inputted from the discharged air temperature sensing unit and the target discharge temperature, and a memory unit configured to store pump rotation speed values in association with temperature differences between the discharged air temperature and the target discharge temperature, and the control unit may be configured to, in the motor drive mode, read out the pump rotation speed value corresponding to the temperature difference between the discharged air temperature and the target discharge temperature calculated by the operation unit from the memory unit and to control the rotational speed of the electric water pump based on the pump rotation speed value read out from the memory unit.

In the air conditioning system, the discharged air temperature sensing unit may include a center vent temperature sensor installed in a center vent existing in a central area of the vehicle room and a floor vent temperature sensor installed in a floor vent existing in a floor surface area of the vehicle room.

In the air conditioning system, the operation unit may be configured to, in the motor drive mode, calculate the temperature difference between the discharged air temperature and the target discharge temperature using data of the discharged air temperature inputted from the discharged air temperature sensing unit and may be configured to use one of the discharged air temperature sensed by the center vent temperature sensor and the discharged air temperature sensed by the floor vent temperature sensor, depending on an air discharge mode available at the time of switching the motor vehicle to the motor drive mode.

The air conditioning system for hybrid vehicles according to the present invention is configured to accurately control the rotational speed of the electric water pump depending on the thermal load of the heater core in the motor drive mode. It is therefore possible to optimally control the amount of engine cooling water circulated through the heater core in conformity with the thermal load of the heater core.

Since the amount of engine cooling water circulated through the heater core can be optimally controlled in conformity with the thermal load of the heater core, it is possible to optimally control the heat generation amount of the heater core in conformity with the thermal load thereof and to optimally control the temperature of the air discharged into the vehicle room.

Inasmuch as the amount of engine cooling water circulated through the heater core can be optimally controlled in conformity with the thermal load of the heater core, it is possible to prevent the excessive circulation of engine cooling water and the resultant excessive reduction of the engine temperature and to prevent the reduction of engine operation efficiency when restarting the engine.

DETAILED DESCRIPTION

A preferred embodiment of an air conditioning system for hybrid vehicles according to the present invention will now be described in detail with reference to the accompanying drawings. Components similar to those of the related art described earlier will be designated by like reference symbols.

Figure 1:
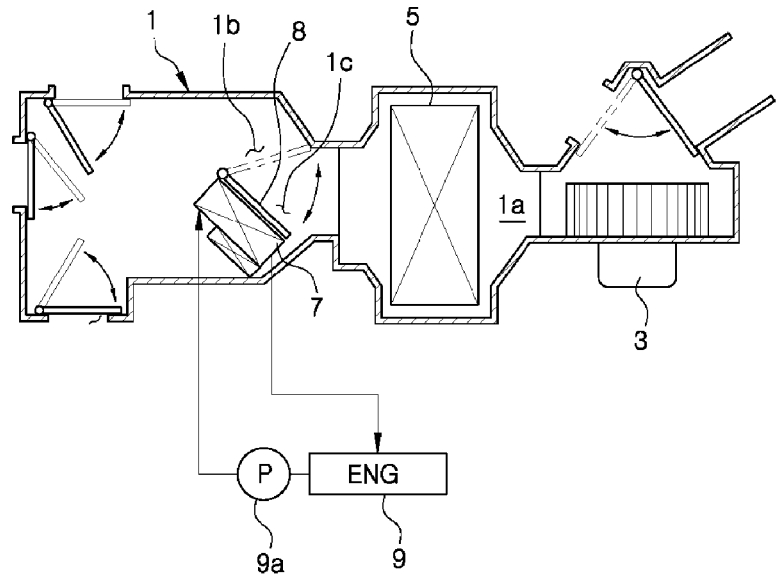
FIG. 1 is a view illustrating the configuration of an air conditioning system for hybrid vehicles of the prior art.
Figure 2:
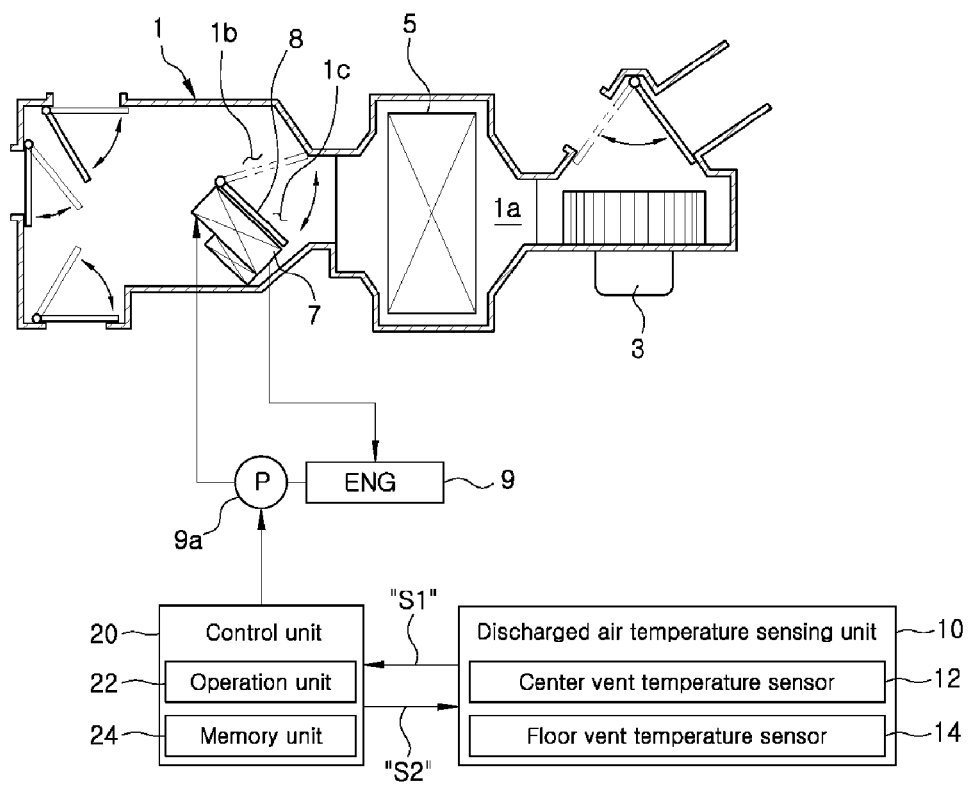
FIG. 2 is a view illustrating the configuration of an air conditioning system for hybrid vehicles according to the present invention.

Prior to describing features of an air conditioning system for hybrid vehicles according to the present invention, an air conditioning system for motor vehicles will be briefly described with reference to FIG. 2.

The air conditioning system for motor vehicles includes an air conditioner case 1 within which a blower 3, an evaporator 5, a heater core 7 and a temperature door 8 are installed.

The blower 3 is configured to draw an internal or external air and to blow the air toward an internal passage 1a of the air conditioner case 1. The evaporator 5 is configured to cool the air blown toward the internal passage 1a. The heater core 7 is configured to heat the air blown toward the internal passage 1a. The temperature door 8 is configured to adjust an opening degree of a cold air passage 1b or a hot air passage 1c.

The heater core 7 is configured to receive hot cooling water from an engine 9. The heater core 7 allows the cooling water to exchange heat with the ambient air, thereby heating the air blown into a vehicle room.

An electric water pump 9a is installed between the heater core 7 and the engine 9. If the motor vehicle is switched from an engine drive mode to a motor drive mode, the electric water pump 9a forcibly pumps the cooling water of the engine 9 and forcibly circulates the cooling water through the heater core 7.

Thus, in the motor drive mode, the engine cooling water is continuously circulated through the heater core 7 even if the engine 9 is stopped. Accordingly, even when the engine 9 is stopped, the heater core 7 can continuously generate heat and can heat the vehicle room.

Next, some features of the air conditioning system for hybrid vehicles according to the present invention will be described with reference to FIG. 2

The air conditioning system according to the present invention includes a discharged air temperature sensing unit 10 configured to sense a discharged air temperature as an actual temperature of an air discharged into the vehicle room.

The discharged air temperature sensing unit 10 includes temperature sensors 12 and 14 installed in specific air discharge vents disposed in the vehicle room.

For example, the discharged air temperature sensing unit 10 includes a center vent temperature sensor 12 installed in a center vent disposed in a central area of the vehicle room and a floor vent temperature sensor 14 installed in a floor vent disposed in a floor area of the vehicle room.

The discharged air temperature sensing unit 10 directly senses a discharged air temperature as an actual temperature of an air discharged into the vehicle room and then inputs data on the discharged air temperature to a control unit 20 which will be described later.

Specifically, the discharged air temperature sensing unit 10 senses the temperature of the air discharged toward a central area of the vehicle room and the temperature of the air discharged toward a floor area of the vehicle room. Then, the discharged air temperature sensing unit 10 inputs data of a temperature S1 of an air discharged toward the central area of the vehicle room and data of a temperature S2 of an air discharged toward the floor area of the vehicle room to a control unit 20 which will be described later.

The air conditioning system according to the present invention includes a control unit 20 provided with a microprocessor. The control unit 20 includes an operation unit 22 and a memory unit 24.

If the motor vehicle is switched from the engine drive mode to the motor drive mode in a state in which the data of the discharged air temperature are inputted to the operation unit 22 from the discharged air temperature sensing unit 10, the operation unit 22 processes the discharged air temperature inputted from the discharged air temperature sensing unit 10 and a target discharge temperature calculated in advance according to a user set temperature and internal/external air temperature conditions, thereby calculating a temperature difference between the discharged air temperature and the target discharge temperature.

By calculating the temperature difference between the discharged air temperature and the target discharge temperature, the operation unit 22 can calculate a thermal load of the heater core 7 using the temperature difference.

For reference, the target discharge temperature is a value calculated in order to optimally and automatically control an evaporator 5, a PTC heater 5a and various kinds of doors 5b and is calculated based on a user set temperature, an external air temperature, an internal air temperature, a solar radiation amount and so forth. The thermal load of the heater core 7 can be accurately calculated by comparing the target discharge temperature with the discharged air temperature.

When the motor vehicle is switched to the motor drive mode, the operation unit 22 calculates the temperature difference between the discharged air temperature and the target discharge temperature based on the data of the discharged air temperature inputted from the discharged air temperature sensing unit 10. Specifically, the operation unit 22 is configured to calculate the temperature difference between the discharged air temperature and the target discharge temperature based on one of two data of the discharged air temperatures inputted from the center vent temperature sensor 12 and the floor vent temperature sensor 14 of the discharged air temperature sensing unit 10.

In particular, as shown in Table 1 below, the discharged air temperature S1 detected by the center vent temperature sensor 12 and the discharged air temperature S2 detected by the floor vent temperature sensor 14 are selectively used depending on the air discharge mode available at the time of the motor vehicle being switched to the motor drive mode.

For example, if the air discharge mode available at the time of the motor vehicle being switched to the motor drive mode is a vent mode, a bi-level mode or a defogging mode, the temperature difference between the discharged air temperature and the target discharge temperature is calculated based on the discharged air temperature S1 detected by the center vent temperature sensor 12.

If the air discharge mode available at the time of the motor vehicle being switched to the motor drive mode is a floor mode or a mixed mode, the temperature difference between the discharged air temperature and the target discharge temperature is calculated based on the discharged air temperature S2 detected by the floor vent temperature sensor 14.

TABLE 1

| Kind of air discharge mode | Temperature sensor used |
| --- | --- |
| Vent mode | Center vent temperature sensor |
| Bi-level mode | Center vent temperature sensor |
| Floor mode | Floor vent temperature sensor |

TABLE 1-continued

| Kind of air discharge mode | Temperature sensor used |
| --- | --- |
| Mixed mode | Floor vent temperature sensor |
| Defogging mode | Center vent temperature sensor |

In the vent mode, the bi-level mode and the defogging mode, the temperature of the air discharged from the center vent heavily affects the thermal load of the heater core 7. Thus, it is preferred that the temperature difference between the discharged air temperature and the target discharge temperature is calculated based on the temperature of the air discharged from the center vent.

In the floor mode and the mixed mode, the temperature of the air discharged from the floor vent heavily affects the thermal load of the heater core 7. Thus, it is preferred that the temperature difference between the discharged air temperature and the target discharge temperature is calculated based on the temperature of the air discharged from the floor vent.

Referring again to FIG. 2, the memory unit 24 is configured to store pump rotation speed values in association with the temperature differences between the discharged air temperature and the target discharge temperature.

The pump rotation speed values stored in association with the temperature differences between the discharged air temperature and the target discharge temperature are control values of the rotational speed of the electric water pump 9a for supplying an optimal amount of engine cooling water to the heater core 7 in conformity with the thermal load of the heater core 7 when the motor vehicle is switched from the engine drive mode to the motor drive mode. The pump rotation speed values are diversely stored in association with the temperature differences between the discharged air temperature and the target discharge temperature.

If the motor vehicle is switched from the engine drive mode to the motor drive mode, the control unit 20 calculates the temperature difference between the discharged air temperature and the target discharge temperature using the operation unit 22.

If the calculation of the temperature difference between the discharged air temperature and the target discharge temperature is completed, the control unit 20 reads out the pump rotation speed value corresponding to the temperature difference between the discharged air temperature and the target discharge temperature from the memory unit 24.

If the pump rotation speed value is read out from the memory unit 24, the control unit 20 controls the rotation speed of the electric water pump 9a based on the pump rotation speed value thus read.

Thus, the rotational speed of the electric water pump 9a can be actively controlled in conformity with the temperature difference between the discharged air temperature and the target discharge temperature. It is therefore possible to accurately control the rotational speed of the electric water pump 9a in conformity with the thermal load of the heater core 7.

As a result, in the motor drive mode, the amount of the engine cooling water circulated through the heater core 7 can be optimally controlled in conformity with the thermal load of the heater core 7. This makes it possible to optimally control the heat generation amount of the heater core 7 in conformity with the thermal load thereof and to optimally control the temperature of the air discharged into the vehicle room.

Inasmuch as the amount of the engine cooling water circulated through the heater core 7 can be optimally controlled in conformity with the thermal load of the heater core 7, it is possible to prevent the excessive circulation of the engine cooling water and the resultant excessive reduction of the temperature of the engine 9 and to prevent the reduction of the operation efficiency of the engine 9 when restarting the engine 9.

It is preferred that the pump rotation speed values stored in the memory unit 24 in association with the temperature differences between the discharged air temperature and the target discharge temperature are set in proportion to the temperature differences between the discharged air temperature and the target discharge temperature.

In other words, it is preferred that the pump rotation speed values stored in the memory unit 24 are set to grow larger in proportion to the increase in the temperature differences between the discharged air temperature and the target discharge temperature.

Furthermore, it is preferred that the pump rotation speed values stored in the memory unit 24 are set to grow smaller in proportion to the decrease in the temperature differences between the discharged air temperature and the target discharge temperature.

As the temperature difference between the discharged air temperature and the target discharge temperature grows larger, the thermal load of the heater core 7 becomes larger. The large thermal load of the heater core 7 indicates the low temperature of the vehicle room. Thus, the rotational speed of the electric water pump 9a is gradually increased as the temperature difference between the discharged air temperature and the target discharge temperature grows larger, thereby increasing the amount of the engine cooling water introduced into the heater core 7 and consequently increasing the heat generation amount of the heater core 7. This makes it possible to cope with the low temperature of the vehicle room.

As the temperature difference between the discharged air temperature and the target discharge temperature grows smaller, the thermal load of the heater core 7 becomes smaller. The small thermal load of the heater core 7 indicates the high temperature of the vehicle room. Thus, the rotational speed of the electric water pump 9a is gradually reduced as the temperature difference between the discharged air temperature and the target discharge temperature grows smaller, thereby reducing the amount of the engine cooling water introduced into the heater core 7 and consequently reducing the heat generation amount of the heater core 7. This makes it possible to cope with the high temperature of the vehicle room.

The pump rotation speed values stored in the memory unit 24 in association with the temperature differences between the discharged air temperature and the target discharge temperature are set in proportion to the temperature differences between the discharged air temperature and the target discharge temperature so that the pump rotation speed values are in a one-to-one correspondence to the temperature differences between the discharged air temperature and the target discharge temperature.

In this case, when the control unit 20 variably controls the rotational speed of the electric water pump 9a depending on the temperature difference between the discharged air temperature and the target discharge temperature at the time of entry into the motor drive mode, it is possible to linearly control the rotational speed of the electric water pump 9a.

Alternatively, the pump rotation speed values stored in the memory unit 24 in association with the temperature differences between the discharged air temperature and the target discharge temperature may be set in proportion to the temperature differences between the discharged air temperature and the target discharge temperature so that the pump rotation speed values intermittently correspond to specific temperature differences between the discharged air temperature and the target discharge temperature.

In this case, when the control unit 20 variably controls the rotational speed of the electric water pump 9a depending on the temperature difference between the discharged air temperature and the target discharge temperature at the time of entry into the motor drive mode, it is possible to control, stage by stage, the rotational speed of the electric water pump 9a.

It is preferred that the control unit 20 is configured to control the rotational speed of the electric water pump 9a in three stages depending on the temperature difference between the discharged air temperature and the target discharge temperature.

Specifically, it is preferred that the control unit 20 is configured to control the rotational speed of the electric water pump 9a in low, middle and high stages depending on the temperature difference between the discharged air temperature and the target discharge temperature.

Referring again to FIG. 2, even if the temperature difference between the discharged air temperature and the target discharge temperature is calculated in real time after the entry into the motor drive mode, the control unit 20 does not unconditionally variably control the rotational speed of the electric water pump 9a depending on the temperature difference between the discharged air temperature and the target discharge temperature.

Only when the predetermined entry conditions are all met, the control unit 20 variably controls the rotational speed of the electric water pump 9a.

The entry conditions refer to the conditions under which the temperature door 8 does not open the cold air passage 1b to the utmost limit, namely the conditions under which the temperature door 8 is controlled not to move to a maximum cooling position.

Thus, only when the conditions under which the temperature door 8 does not open the cold air passage 1b to the utmost limit are met, the control unit 20 variably controls the rotational speed of the electric water pump 9a depending on the temperature difference between the discharged air temperature and the target discharge temperature.

The temperature door 8 opens the cold air passage 1b to the utmost limit in a cooling mode used in summer. By employing the aforementioned configuration, it is possible to prevent unnecessary variation of the rotational speed of the electric water pump 9a and to prevent unnecessary circulation of the engine cooling water.

If the motor drive mode is cancelled or the predetermined cancellation condition is met when the rotational speed of the electric water pump 9a is variably controlled after entry into the motor drive mode, for example, if the temperature door 8 is moved to a maximum cooling position and the maximum opening condition of the cold air passage 1b is met, the control unit 20 stops variably controlling the rotational speed of the electric water pump 9a depending on the temperature difference between the discharged air temperature and the target discharge temperature.

Figure 3:
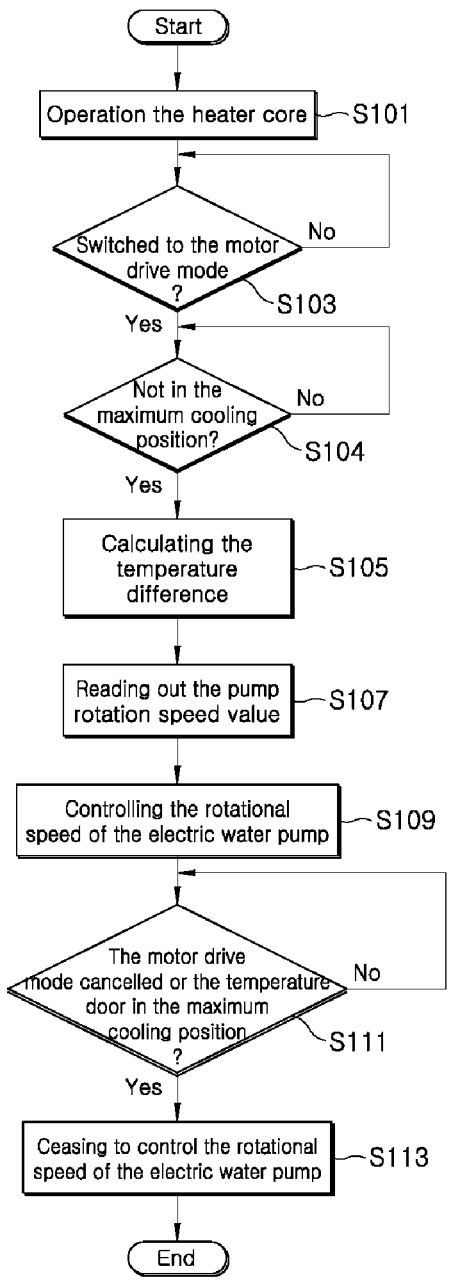
FIG. 3 is a flowchart illustrating an operation example of the air conditioning system for hybrid vehicles according to the present invention.

Next, an operation example of the air conditioning system configured as above will be described with reference to FIGS. 2 and 3.

First, the heater core 7 is turned on (S101). In this state, the control unit 20 determines whether the motor vehicle is switched from the engine drive mode to the motor drive mode (S103).

If it is determined that the motor vehicle is switched to the motor drive mode, the control unit 20 determines whether the condition under which the temperature door 8 is controlled not to move to a maximum cooling position is met (S104).

If it is determined that the condition under which the temperature door 8 is controlled not to move to a maximum cooling position is met, the control unit 20 processes the discharged air temperature inputted from the discharged air temperature sensing unit 10 and the predetermined target discharge temperature to calculate a temperature difference between the discharged air temperature and the target discharge temperature (S105).

If the calculation of the temperature difference between the discharged air temperature and the target discharge temperature is completed, the control unit 20 reads out the pump rotation speed value corresponding to the calculated temperature difference from the memory unit 24 (S107).

If the reading of the pump rotation speed value is completed, the control unit 20 controls the rotational speed of the electric water pump 9a based on the pump rotation speed value thus read (S109).

Then, the rotational speed of the electric water pump 9a is actively controlled in a corresponding relationship with the temperature difference between the discharged air temperature and the target discharge temperature. Thus, the rotational speed of the electric water pump 9a is accurately controlled while actively coping with the change in the thermal load of the heater core 7.

As a result, the amount of engine cooling water circulated through the heater core can be optimally controlled in conformity with the thermal load of the heater core. It is therefore possible to optimally control the heat generation amount of the heater core in conformity with the thermal load thereof and to optimally control the temperature of the air discharged into the vehicle room.

While controlling the rotational speed of the electric water pump 9a after entry into the motor drive mode, the control unit 20 determines whether the motor drive mode is cancelled or whether the predetermined cancellation condition is met, namely whether the temperature door 8 is controlled to move to the maximum cooling position (S111).

If it is determined that the motor drive mode is cancelled or that the temperature door 8 is controlled to move to the maximum cooling position, the control unit 20 ceases to control the rotational speed of the electric water pump 9a (S113).

While some preferred embodiments of the present invention have been described above, the present invention is not limited to these embodiments. It is to be understood that various changes and modifications may be made without departing from the scope of the invention defined in the claims.

What is claimed is:

1. An air conditioning system for a hybrid vehicle, comprising:
 a heater core configured to receive engine cooling water from an engine and heat an air blown into a vehicle room;
 an electric water pump configured to pump the engine cooling water and to forcibly circulate the engine cooling water through the heater core when the vehicle is switched from an engine drive mode to a motor drive mode;

a discharged air temperature sensing unit configured to sense a discharged air temperature as a temperature of an air discharged into the vehicle room; and a control unit configured to, when the vehicle is switched from the engine drive mode to the motor drive mode, differentially control a rotational speed of the electric water pump depending on a temperature difference between the discharged air temperature inputted from the discharged air temperature sensing unit and a target discharge temperature calculated in advance based on internal/external temperature conditions and a user set temperature, so that an amount of the engine cooling water supplied to the heater core is differentially controlled depending on the temperature difference, wherein the discharged air temperature sensing unit includes a center vent temperature sensor installed in a center vent existing in a central area of the vehicle room and a floor vent temperature sensor installed in a floor vent existing in a floor surface area of the vehicle room, and wherein the control unit includes an operation unit configured to use one of a discharged air temperature sensed by the center vent temperature sensor or a discharged air temperature sensed by the floor vent temperature sensor, depending on an air discharge mode available at a time of switching the vehicle to the motor drive mode.

2. The air conditioning system of claim 1, wherein the operation unit is configured to, in the motor drive mode, calculate the temperature difference between the discharged air temperature and the target discharge temperature by processing the discharged air temperature inputted from the discharged air temperature sensing unit and the target discharge temperature, and a memory unit configured to store a pump rotation speed value in association with different temperature differences between the discharged air temperature and the target discharge temperature, and the control unit is configured to, in the motor drive mode, read out the pump rotation speed value corresponding to the temperature difference between the discharged air temperature and the target discharge temperature calculated by the operation unit from the memory unit and to control the rotational speed of the electric water pump based on the pump rotation speed value read out from the memory unit.

3. The air conditioning system of claim 1, wherein the operation unit is configured to, in the motor drive mode, calculate the temperature difference between the discharged air temperature and the target discharge temperature using data of the discharged air temperature inputted from the discharged air temperature sensing unit.

4. The air conditioning system of claim 3, wherein the operation unit is configured to, when the air discharge mode available at the time of switching the vehicle to the motor drive mode is a vent mode, a bi-level mode, or a defogging mode, calculate the temperature difference between the discharged air temperature and the target discharge temperature using the discharged air temperature sensed by the center vent temperature sensor and is configured to, when the air discharge mode available at the time of switching the vehicle to the motor drive mode is a floor mode or a mixed mode, calculate the temperature difference between the discharged air temperature and the target discharge temperature using the discharged air temperature sensed by the floor vent temperature sensor.

5. The air conditioning system of claim 1, wherein the control unit is configured to control the rotational speed of the electric water pump in proportion to the temperature difference between the discharged air temperature and the target discharge temperature.

6. The air conditioning system of claim 5, wherein the control unit is configured to linearly control the rotational speed of the electric water pump depending on the temperature difference between the discharged air temperature and the target discharge temperature.

7. The air conditioning system of claim 5, wherein the control unit is configured to control, stage by stage, the rotational speed of the electric water pump depending on the temperature difference between the discharged air temperature and the target discharge temperature.

8. The air conditioning system of claim 5, wherein the control unit is configured to, at the time of entry into the motor drive mode, control the rotational speed of the electric water pump depending on an opening degree of a temperature door.

9. The air conditioning system of claim 8, wherein the control unit is configured to, only when a predetermined motor drive mode entry condition is met, control the rotational speed of the electric water pump depending on the temperature difference between the discharged air temperature and the target discharge temperature.

10. The air conditioning system of claim 9, wherein the predetermined motor drive mode entry condition is a condition under which the temperature door is not controlled to move to a maximum cooling position, and the control unit is configured to, only when the condition under which the temperature door is not controlled to move to the maximum cooling position is met, control the rotational speed of the electric water pump depending on the temperature difference between the discharged air temperature and the target discharge temperature.

11. The air conditioning system of claim 10, wherein the control unit is configured to, if the motor drive mode is cancelled or a predetermined motor drive mode cancellation condition is met while controlling the rotational speed of the electric water pump after entry into the motor drive mode, cease to control the rotational speed of the electric water pump depending on the temperature difference between the discharged air temperature and the target discharge temperature.

12. The air conditioning system of claim 11, wherein the predetermined motor drive mode cancellation condition is a condition under which the temperature door is controlled to move to the maximum cooling position, and the control unit is configured to, if the condition under which the temperature door is controlled to move to the maximum cooling position is met, cease to control the rotational speed of the electric water pump depending on the temperature difference between the discharged air temperature and the target discharge temperature.

* * * * *